United States Patent
Tucker et al.

(10) Patent No.: US 9,635,127 B2
(45) Date of Patent: Apr. 25, 2017

(54) PERSONALIZATION OF DEVICES WHILE PACKAGED

(71) Applicant: Apple Inc., Cupertino, CA (US)

(72) Inventors: Brian J. Tucker, Cupertino, CA (US); Christopher Russell Costello, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/495,281

(22) Filed: Sep. 24, 2014

(65) Prior Publication Data
US 2015/0089091 A1   Mar. 26, 2015

Related U.S. Application Data

(60) Provisional application No. 61/883,144, filed on Sep. 26, 2013.

(51) Int. Cl.
| | |
|---|---|
| *G06F 3/00* | (2006.01) |
| *H04L 29/08* | (2006.01) |
| *H04N 21/45* | (2011.01) |
| *H04N 21/436* | (2011.01) |
| *H04N 21/4363* | (2011.01) |
| *H04W 4/00* | (2009.01) |
| *H04M 1/725* | (2006.01) |
| *H04L 12/24* | (2006.01) |

(52) U.S. Cl.
CPC ........ *H04L 67/303* (2013.01); *H04M 1/7253* (2013.01); *H04M 1/72563* (2013.01); *H04N 21/43615* (2013.01); *H04N 21/43637* (2013.01); *H04N 21/4516* (2013.01); *H04W 4/001* (2013.01); *H04L 41/0803* (2013.01); *H04M 1/72525* (2013.01); *H04M 2250/02* (2013.01); *H04M 2250/06* (2013.01); *H04W 4/008* (2013.01)

(58) Field of Classification Search
None
See application file for complete search history.

(56) References Cited

U.S. PATENT DOCUMENTS

| | | |
|---|---|---|
| 7,482,908 B2 | 1/2009 | Kean et al. |
| 8,355,711 B2 | 1/2013 | Heins et al. |

(Continued)

OTHER PUBLICATIONS

International Search Report and Written Opinion dated Apr. 6, 2015, PCT/US2014/053576, 8 pages.

(Continued)

*Primary Examiner* — Idriss N Alrobaye
*Assistant Examiner* — Richard B Franklin
(74) *Attorney, Agent, or Firm* — Brownstein Hyatt Farber Schreck, LLP

(57) ABSTRACT

Devices are personalized while the devices are still at least partially contained within packaging. Discovery information may be exchanged between a packaged device and a user device. Such discover information may be exchanged as a result of the packaged device and the user device being moved into proximity with each other. A communication connection may be configured between the packaged device and the user device. Data may be obtained at the packaged device related to the communication connection. The packaged device may be personalized for a user utilizing the data.

21 Claims, 3 Drawing Sheets

(56) References Cited

U.S. PATENT DOCUMENTS

| | | | |
|---|---|---|---|
| 8,762,704 B2* | 6/2014 | Rothkopf | G06F 1/1626 |
| | | | 206/320 |
| 8,855,562 B2 | 10/2014 | Rajaraman et al. | |
| 9,307,347 B2* | 4/2016 | Reunamaki | G06F 8/65 |
| 2010/0302006 A1 | 12/2010 | Subramanian | |
| 2011/0018754 A1* | 1/2011 | Tojima | G08C 17/00 |
| | | | 341/176 |
| 2012/0166556 A1 | 6/2012 | Kim et al. | |
| 2013/0109323 A1 | 5/2013 | Ruutu et al. | |
| 2013/0217336 A1 | 8/2013 | McCormack et al. | |
| 2013/0326495 A1* | 12/2013 | Reunamaki | H04W 4/008 |
| | | | 717/173 |
| 2014/0281490 A1 | 9/2014 | Prakash et al. | |

OTHER PUBLICATIONS

Samsung Galaxy S4, "Galaxy S4 User Manual GT-19505," Apr. 2013, especially pp. 73 and 129, retrieved from the Internet on Mar. 11, 2015, URL: <http://www.internode.on.net/pdf/support/user-manual-samsung-galaxy-s4.pdf>.

* cited by examiner

PERSONALIZATION OF DEVICES WHILE PACKAGED

CROSS-REFERENCE TO RELATED APPLICATION

This application claims the benefit under 35 U.S.C. §1.119(e) to U.S. Provisional Patent Application No. 61/883,144, filed Sep. 26, 2013, entitled "Personalization of Devices While Packaged," the entirety of which is incorporated herein by reference as if fully recited herein.

TECHNICAL FIELD

This disclosure relates generally to personalization of electronic devices, and more specifically to personalization of electronic devices while the electronic devices are still packaged.

BACKGROUND

Electronic devices (such as smart phones, mobile computing devices, laptop computing devices, desktop computing devices, tablet computing devices, tablet computing devices, wearable devices, digital media players, and so on) are often personalized for one or more particular users. Such personalization may include loading of files, configuration of user accounts, configuration of user interfaces, installation of applications, configuration of user accounts, and any other such configuration of an electronic device for use by a user.

However, personalization of a newly obtained electronic device may be burdensome and/or complicated for a user. A user may need to remove a newly obtained electronic device from the packaging in which it was obtained, power on the electronic device, and perform a variety of operations to personalize the device.

SUMMARY

The present disclosure discloses systems and methods for personalization of devices while packaged. Discovery information may be exchanged between a packaged device and a user device. A communication connection may be configured between the packaged device and the user device. Data may be obtained at the packaged device related to the communication connection. The packaged device may be personalized utilizing the data.

In various implementations, a method for personalization of devices while packaged may include: exchanging discovery information between a packaged device and a user device; configuring a communication connection between the packaged device and the user device; obtaining data at the packaged device related to the communication connection; and personalizing the packaged device utilizing the data.

In one or more implementations, a system for personalization of devices while packaged may include a packaged device that is at least partially contained within packaging and a user device. Discovery information may be exchanged between the packaged device and the user device; a communication connection may be configured between the packaged device and the user device; data may be obtained at the packaged device related to the communication; and the packaged device may be personalized utilizing the data.

In some implementations, a packaged electronic device may include packaging and an electronic device at least partially contained within the packaging. The electronic device may exchange discovery information with a user device, configure a communication connection with the user device, obtain data related to the communication, and personalize the electronic device utilizing the data while the electronic device is at least partially contained within the packaging.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample systems, methods, and computer program products that embody various elements of the present disclosure. However, it should be understood that the described disclosure may be practiced in a variety of forms in addition to those described herein.

The present disclosure discloses systems and methods for personalization of devices while packaged. Discovery information may be exchanged between a packaged device and a user device. A communication connection may be configured between the packaged device and the user device. Data may be obtained at the packaged device related to the communication connection. The packaged device may be personalized utilizing the data.

In this way, the packaged device may be personalized for the user before the packaged device is removed from its packaging. Such personalization may include loading of files, configuration of user accounts, configuration of user interfaces, installation of applications, configuration of user accounts, and any other such configuration for use by a user. When the user first utilizes the packaged device after removing the packaged device from its packaging, the formerly packaged device may provide a personalized experience for the user upon first use.

Figure 1:
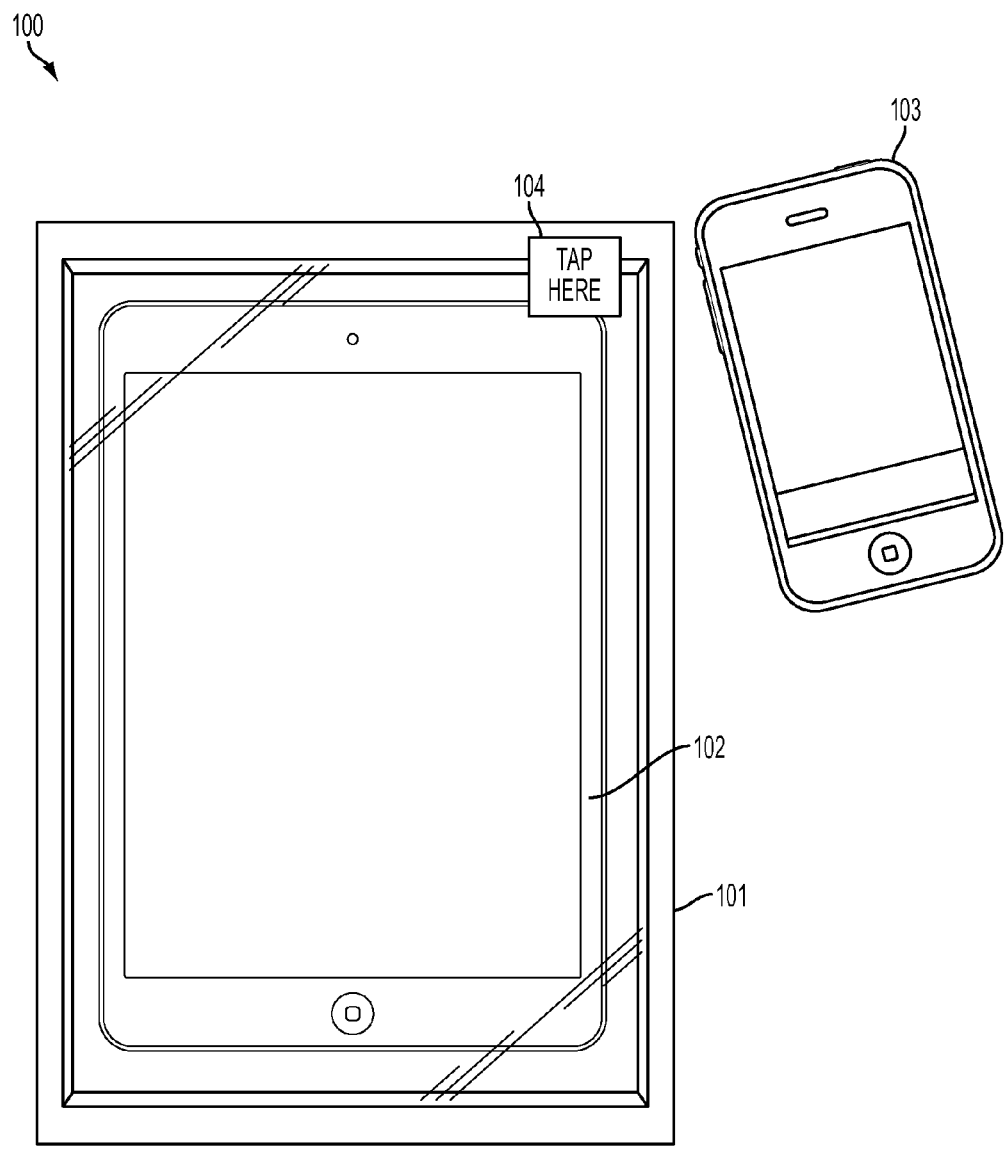
FIG. 1 is an isometric view of a system for personalization of devices while packaged.

FIG. 1 is an isometric view of a system 100 for personalization of devices while packaged. As illustrated, the system includes a user device 103 and a packaged device 102. As also illustrated, the packaged device is at least partially enclosed within packaging 101.

Although the packaged electronic device 102 is illustrated as a tablet computing device and the user electronic device 103 is illustrated as a smart phone, it is understood that this is an example. In various implementations, the packaged electronic device and/or the user electronic device may be any kind of electronic device. Such electronic devices may include, but are not limited to a cellular telephone, a laptop computer, a desktop computer, a tablet computer, a smart phone, a mobile computer, a wearable device, a digital media player, a display, a router, a networking component, a speaker, a set top box, a digital media server, and/or any other kind of electronic device.

The packaged electronic device 102 may exchange discovery information with the user electronic device 103. In some cases, the user electronic device may be brought into proximity with the packaging 101 in order to facilitate such discovery information exchange. In such cases, the packaging may include one or more indicators 104 that direct the user regarding how to bring the user electronic device into proximity with the packaged electronic device.

In this example, the packaging includes a "tap here" label that indicates that the user should tap the user electronic device to the label. Tapping the user electronic device to the label may bring the packaged electronic device and the user electronic device into sufficient proximity for discovery information to be exchanged.

A communication connection may be configured between the packaged device 102 and the user device 103. Such a communication connection may be configured utilizing the exchanged discovery information. Data may be obtained at the packaged device related to the communication connection and the packaged device may be personalized utilizing the data.

Figure 2:
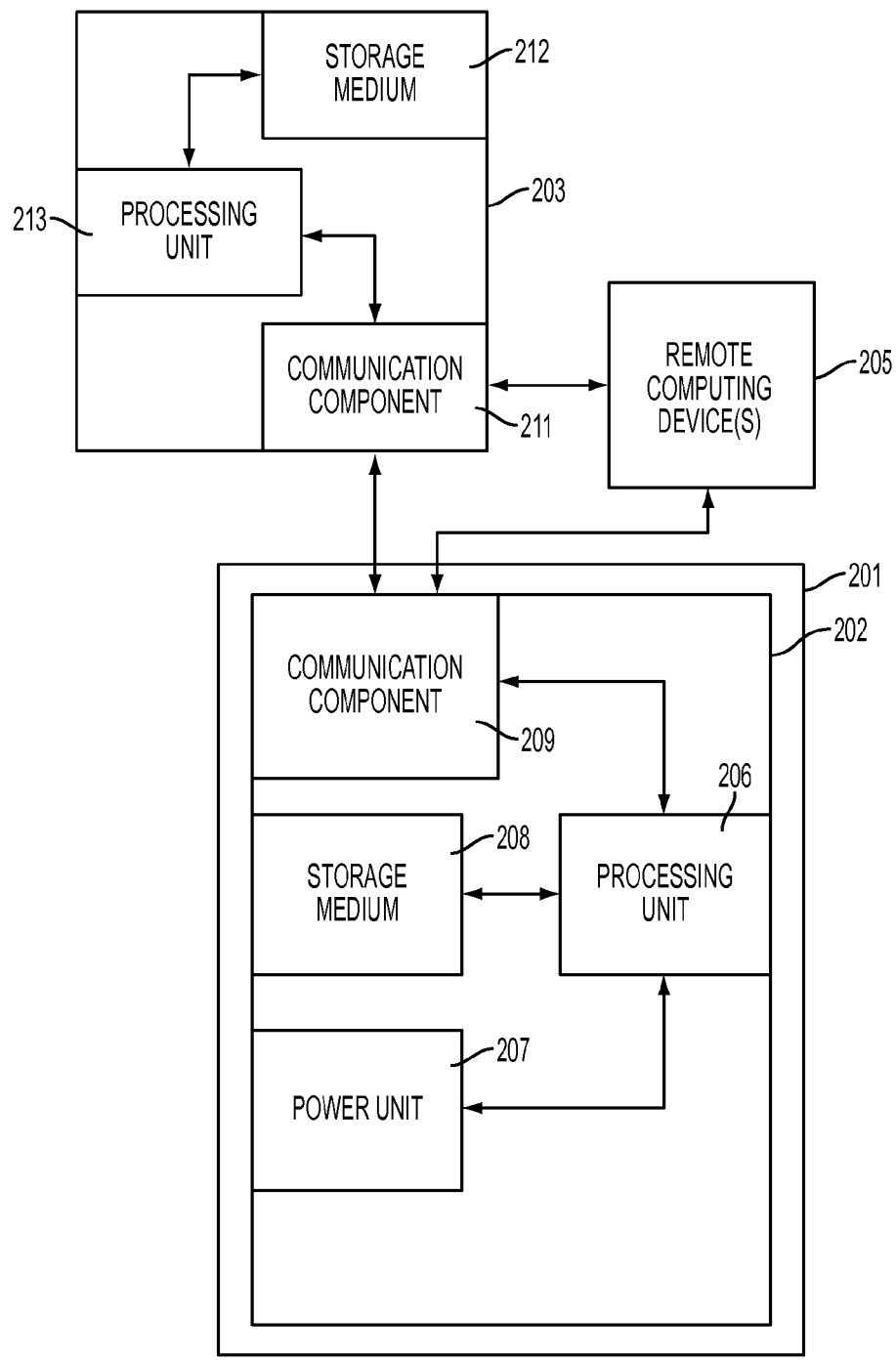
FIG. 2 is a block diagram of a system for personalization of devices while packaged.

FIG. 2 is a block diagram of a system 200 for personalization of devices while packaged. Such a system may be the system 100 of FIG. 1. Returning to FIG. 2, the system 200 may include a packaged device 202 (which may be at least partially enclosed in packaging 201), a user device 203, and/or one or more remote computing devices 205.

The packaged device 202 may include one or more processing units 206, one or more power units 207 (such as one or more batteries), one or more non-transitory storage media 208 (which may take the form of, but is not limited to, a magnetic storage medium; optical storage medium; magneto-optical storage medium; read only memory; random access memory; erasable programmable memory; flash memory; and so on), and/or one or more communication components 209. The processing unit 206 may obtain power from the power unit, execute one or more instructions stored in the storage medium 208 to perform various packaged device functions, and/or utilize the communication component to communicate with one or more other devices (such as the user device 203 and/or the remote computing device(s) 205).

Similarly, user device 203 may include one or more processing units 213, one or more non-transitory storage media 212, and/or one or more communication components 211. Though not illustrated, the remote computing device(s) 205 may include similar and/or different components.

In one or more implementations, the packaged device 202 may include a variety of power modes. Such power modes may include an "off" power mode wherein the packaged device does not utilize power, a "packaged" power mode that uses a limited amount of power in order to enable communications with the user device 203 and/or the remote computing device(s) 205 in order to personalize the packaged device while the packaged device is still at least partially contained within the packaging 201, and/or a "full" power mode that utilizes more power than the packaged power mode and provides normal use of the packaged electronic device for one or more users. In addition to such power modes, the packaged electronic device may include various power modes such as a "sleep" power mode and/or a "hibernate" power mode that enable the packaged device to not utilize the full power mode after having been utilized by a user but not currently being in use.

In some implementations, the packaged device 202 may transmit one or more discovery messages while the packaged device is contained at least partially within the packaging 201. Such discovery messages may be transmitted while the packaged device is in the packaged power mode discussed above. In some cases, the discovery messages may be transmitted utilizing the communication component 209 utilizing a low power communication method such as Bluetooth LE (low energy).

In some cases, the packaged device 202 may transmit such discovery messages periodically. Such as period may be based on a preset duty cycle. For example, the packaged device 202 may periodically (such as once every minute) transition from an off power state (or other power state that utilizes less power than the packaged power state) to the packaged power state and transmit a discovery message. The packaged device may then wait a period of time (such as fifteen seconds) for a response. If no response is received, the packaged device may transition back to the off state.

By way of another example, in some cases the packaged device 202 may remain consistently in the packaged power state and periodically send out discovery messages. In such examples, discovery messages may be transmitted once every ten seconds.

In a variety of cases, the packaged device 202 may utilize different channels to transmit the discovery messaged. For example, in cases where the packaged device utilizes WiFi to transmit discovery messages, the packaged device may utilize three different WiFi channels (such as channel 1, 6, and 8) to transmit discovery messages and may alternate between the three when periodically transmitting discovery messages.

In cases where the packaged device 202 utilizes a low power communication method such as Bluetooth LE, the user device 203 may need to be within a particular proximity of the packaged device (such as two inches) in order for the user device to receive the discovery message. In such cases, the user device may receive the transmitted discover message when the user device is brought within the particular proximity of the packaged device.

Although the above describes the packaged device 202 as periodically transmitting discovery messages, it is understood that this is an example. In various cases, the packaged device may transmit discovery messages in response to a prompt. Such a prompt may include a transmission from the user device 203.

For example, the user device 203 may transmit a presence inquiry. Such a presence inquiry may be transmitted in response to a request received from a user of the user device. The packaged device 202 may monitor receipt of such presence inquiries (whether continuously, periodically, and so on). If a presence inquiry is received, the packaged device may transmit a discovery message in response.

By way of another example, the packaged device 202 may include a motion sensor (not shown) such as an accelerometer. In response to motion of the packaged device as detected by the motion sensor, the packaged device may transmit a discovery message.

By way of still another example, the packaged device 202 may include other types of sensors (not shown) that the packaged device may monitor. In some cases, the packaged device may include a light sensor. When the light sensor receives a particular light (such as natural lighting, a pattern of light transmitted by a light of the user device 203, and so on), the packaged device may transmit a discovery message in response. In some cases, this may involve transitioning the packaged device from one power state to another power state.

The user device 203 may receive a discovery message from the packaged device 202. Such a discovery message may include information that identifies the packaged device. For example, the discovery message may include one or more serial numbers, device identifiers, device descriptions, network configuration information (such as one or more media access control addresses, Internet protocol addresses, and so on) and/or other such information. Such information may enable the user device to identify the packaged device to the user (such as via one or more messages displayed via one or more display devices, speakers, and so on).

Additionally, the discovery message may include one or more identifiers that identify the message as a discovery message. Such an identifier may enable the user device 203 to understand what is to be done with the discovery message Absent such an identifier, the user device may not understand how to handle a discovery message. In some cases, a discovery message may be a packet of information and the identifier may be one or more bits that identify the packet as relating to a discovery message.

In some cases, the information may be utilized to the user device 203 to obtain additional information from the remote computing device(s) 205. For example, the discovery message may include a product identifier. The user device may transmit the user identifier received from the packaged device 202 to the remote computing device(s). In response, the user device may receive a product identifier (such as "Tablet Computing Device") that may then be presented to a user to identify the packaged device from which the user device has received a discovery message.

In some cases, the additional information may be utilized to perform various activities. For example, the additional information may be utilized to add the packaged device 202 to one or more electronic shopping carts, direct a browser to one or more web pages, and/or other such activities.

After the user device 203 has received a discovery message from the packaged device 202, a communication connection may be configured between the user device and the packaged device. For example, upon receipt of a discovery message, the user device may provide a prompt to a user inquiring whether or not the user wishes to personalize the packaged device. Such a prompt may identify the packaged device to the user so that the user is aware as to the identity of the packaged device with which the user device is prepared to communicate.

Such a prompt may require the user to enter information in order to configure a communication connection between the user device 203 and the packaged device 202. In some cases, such information may include one or more serial numbers and/or other codes and/or identifiers displayed by the packaged device (such as via one or more display screens and/or speakers in response to response from the user device to a transmitted discovery message) and/or on the packaging 201. This may confirm that the user desires to connect the particular user device with the particular packaged device.

Further, in some cases, such information may include one or more identifiers (such as one or more logins, email addresses, and so on) and/or security mechanisms (such as one or more passwords, certificates, biometrics, and so on) related to the user device and/or one or more user accounts (such as a cloud storage account, application store account, and/or other such user accounts). This kind of information may be utilized to verify (such as via the remote computing device(s) 205) whether or not the user is allowed to configure communications between the user device 203 and the packaged device 202.

For example, the packaged device 202 may only be allowed to be personalized after the packaged device has been purchased. In such cases, the information may be utilized to determine whether or not the packaged device has been purchased before allowing configuration of communications between the user device 203 and the packaged device. In some cases of such examples, the remote computing device(s) 205 may maintain a list of purchased package devices and may confirm whether or not configuration of communications is allowed. In other cases, an activation ticket may be provided to the user (such as a code on a receipt that may be entered into the user device) or the user device (such as in cases where the user device may have been utilized to purchase the packaged device or where an activation ticket is transmitted to the user device after purchase of the packaged device separate from the user device) after purchase that verifies that configuration of communications is allowed.

In some cases, the packaged device 202 may be located in a store and may not yet have been purchased by the user. In such cases, the information may include purchase information confirming that the user wishes to purchase or rent the packaged device 202 and/or providing financial information for the purchase or rental. For example, the information may include credit card information, bank account information, user account information associated with financial information, and so on for the rental or purchase. As such, confirmation that the user wishes to configure communications with the packaged device may purchase or rent the packaged device for the user.

In various cases, the discovery message may enable the user device 203 to display product information (such as product specifications, product options, cost, and/or other such information). Such information may be included in the discovery message and/or obtainable by the user device from information in the discovery message (such as by one or more identifiers included in the discovery message transmitted by the user device to the remote computing device(s) 205). In such cases, such product information may be displayed as part of the one or more prompts.

If a confirmation is received confirming that the user wishes to configure communications between the user device 203 and the packaged device 202, such a communication connection may be configured. In some cases, the communication connection may be configured utilizing the same communication method utilized for the discover messages (such as Bluetooth LE). In other cases, the communication connection may be configured utilizing a different communication method than the method utilized for the discover messages (such as where Bluetooth LE is utilized for the discover messaged and WiFi is utilized for the communication connection. As such, though the packaged device and the user device are illustrated and described as having a single communication component 209 and 211, respectively, it is understood that this is an example and the packaged device and the user device may have a variety of different communication components.

In still other cases, the communication connection may be configured through the remote computing device(s) 205. For example, both the user device 203 and the packaged device 202 may communicate with the remote computing device(s) and may communicate with each other by passing messages through the remote computing device(s).

Data may be obtained at the packaged device 202 related to the communication connection. Such data may be obtained from the user device 203, the remote computing device(s) 205 (which may be one or more cloud data storage computing devices), from one or more user accounts, and so on. The packaged device may then be personalized utilizing such data. For example, the packaged device may configure itself utilizing such data to personalize itself for the user. Such personalization may include pairing the user device with the packaged device.

For example, data such as one or more user accounts, files, configuration settings, user interface configurations, and so on may be obtained from the user device 203. In some cases, such data may be the data utilized in operation of the user device (such as a contact list utilized by the user device). However, in other cases such data may be one or more backups stored on the user device.

By way of another example, data may be stored in a cloud computing storage arrangement accessible via the remote computing device(s) 205. In such a case, such data may be obtained from the remote computing device(s) (either directly, indirectly, via the user device 203, and so on).

By way of still another example, the user device 203 may not belong to the user for which the packaged device 202 is to be personalized. In some cases, such a user device may be configured for a store that sells the packaged device. In such cases, user account information entered by the user may be utilized to obtain such data stored by the remote computing device(s) 205 related to the user account.

In other cases, this may enable a purchaser of the packaged device 202 to utilize the purchaser to use their user device 203 to personalize the packaged device for another user by entering account information for that other user. In still other cases, this may enable a user to utilize another user's user device to personalize the packaged device that the user is purchasing.

In some implementations, the communication connection may be configured while the packaged device 202 is in the same power state as the one in which the packaged device transmitted the discovery message. However, in other cases, the packaged device may enter a different power state from the one utilized to transmit the discovery message as part of configuring the communication connection. For example, the packaged device may transmit discover messages in a packaged power mode and configure communications in a full power mode, a "pairing" power mode that utilizes more power than the packaged power mode but less power than the full power mode, and/or other such power states.

The packaged device 202 may be removed from the packaging 201 and utilized by a user. If the packaged device is removed from the packaging and utilized after having been personalized, the packaged device may provide a personalized experience for the user upon first use. For example, if the user's name is "Robert Paulson," the packaged device may display a message reading: "Hello, Robert" when first powered on for use by the user.

In various implementations, pairing of the packaged device 202 with the user device 203 may link the two devices. As such, when one or more data items, configuration settings, and/or other such items are modified on either the packaged device or the user device, the modification may be propagated to the other device. Thus, the packaged device and the user device may be synchronized after the pairing.

In some implementations, the power unit 207 may include a battery. In some cases, such a battery may not be fully charged when the packaged device 202 is placed in the packaging 101. Instead, the battery may be partially charged at such a time. For example, the battery may be in a "half-charged" state when the packaged device is placed in the packaging.

In various cases, such a battery may be utilized to power the packaged device 202 during operation of the packaged device by a user after the packaged device is removed from the packaging 201. However, in other cases the battery may be utilized to power the packaged device only while the packaged device is at least partially contained in the packaging. In such cases, the power unit 207 may include one or more other power sources (such as an alternating current power connection) that are utilized to power the packaged device during operation of the packaged device by the user after the packaged device is removed from the packaging.

In one or more cases, attempted exchange of discovery information may indicate to the packaged device 202 and/or the user device 203 that the packaged device and the user device are not close enough for successful exchange of discovery information, configuration of the communication connection and so on. Such an indication may be obtained by analyzing the signal strength of a communication utilized to transmit the discovery information and/or other such indicia. If such an indication is obtained, the packaged device and/or the user device may indicate to a user (such as via one or more display screens, speakers, and so on) to move the user device and the packaged device closer together.

In various cases, discovery information and/or other such information transmitted by the packaged device 202 and/or the user device 203 may be encrypted. In such a case, the information may only be decrypted by a device that includes decryption information authorized to decrypt the encrypted information. Such decryption information may include one or more certificates, keys, passwords, and so on.

For example, a particular manufacturer may configure all of their electronic devices with a particular set of encryption and decryption keys. In this example, if the packaged device 202 and the user device 203 are produced by the manufacturer, the packaged device and the user device may be configured with the same encryption and decryption keys and may be able to decrypt information from each other. However, devices manufactured by other manufacturers may not have those encryption and decryption keys and may therefore not be able to decrypt the information.

Figure 3:
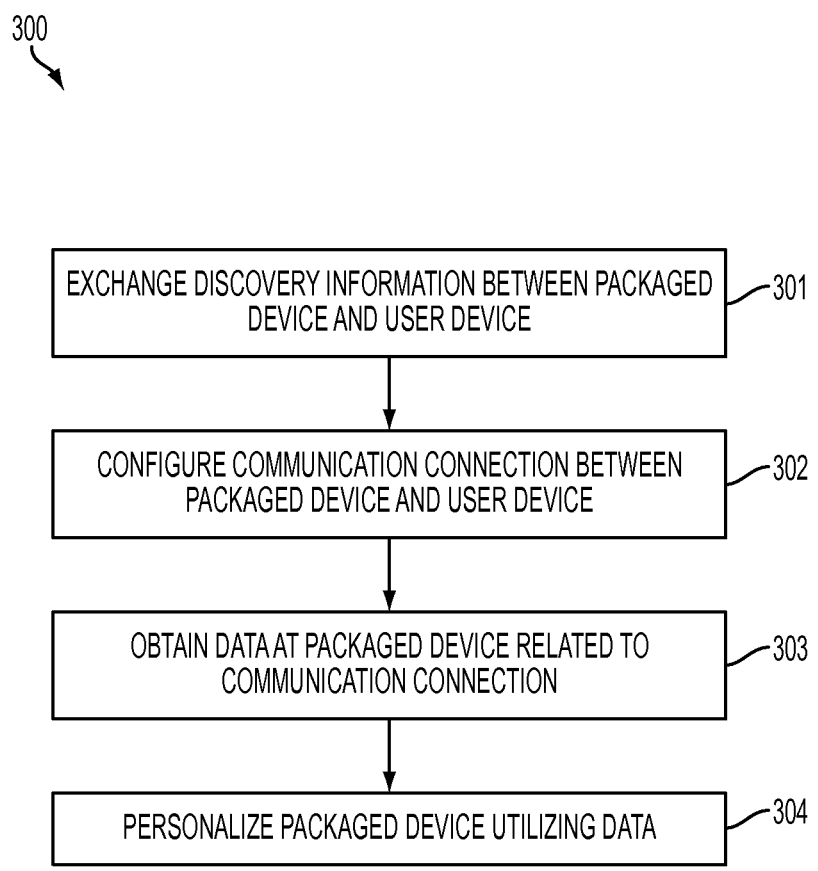
FIG. 3 is a method diagram illustrating a method for personalization of devices while packaged. This method may be performed by the system of FIGS. 1 and/or 2.

FIG. 3 is a flow chart illustrating a method for personalization of devices while packaged. This method may be performed by the system of FIGS. 1 and/or 2.

The flow begins at block 301 where a packaged device exchanges discovery information with a user device. The flow then proceeds to block 302 where a communication connection may be configured between the packaged device and the user device. The flow may then next proceed to block 303.

At block 303, data may be obtained at the packaged device. The data may be related to the communication connection. In some cases, the data may be related to the exchanged discovery information instead of the communication connection. The flow may then proceed to block 304 where the packaged device is configured to communicate with the user device.

Although the method 300 is illustrated and described above as including particular operations performed in a particular order, it is understood that this is an example. In various implementations, different arrangements of the same, similar, and/or different operations may be performed without departing from the scope of the present disclosure. For example, in some implementations the method 300 may include an additional operation of receiving a confirmation to configure a communication operation between the packaged device and the user device between blocks 301 and 302.

Returning to FIG. 2, although the present disclosure has been illustrated and described above as performing personalization of a packaged device while the packaged device is still at least partially contained within packaging, it is understood that this is an example. In various implementations, one or more components of the system 200 may be utilized for other purposes without departing from the scope of the present disclosure.

For example, discover messages transmitted by the packaged device 202 may be utilized in warehouse or other operations. In one such case, a warehouse worker may move through a room where the packaged device is located along with other devices that are operable to transmit such discovery messages. The warehouse worker may utilize an electronic device that is operable to receive such discovery messages. The warehouse worker may utilize the electronic device to locate the packaged device or other devices, inventory the electronic device or other devices, determine whether or not all the devices that should be in a room currently are in that room, and/or perform other functions.

By way of example, the warehouse worker may receive an order from a user for the packaged device 202. The warehouse worker may utilize the electronic device to personalize the packaged device based on user account information or other information provided by the user with the order. The warehouse worker may then arrange for the personalized packaged device to be delivered to the user.

In another example, the packaged device 202 may be able to perform various other activities other than personalization while the packaged device is at least partially contained within the packaging 201. In some cases, such other activities may include updating software, firmware, and/or other such data of the packaged device. Such data may include data utilized to perform the personalization while the packaged device is still at least partially contained within the packaging.

For example, a packaged device 202 may periodically activate a WiFi connection to the remote computing device(s) 205 to check whether one or more security updates have been issued for software utilized to perform the personalization while the packaged device is still at least partially contained within the packaging 201. If such a security update has been issued, the packaged device may utilize the WiFi connection to obtain and install the security update.

In yet another example, a beacon element (not shown) may be included in the packaging 201 separate from the packaged device 202 that is able to exchange discovery information and/or communicate with the user device 203 similar to how the packaged device is illustrated and described above as doing. In such examples, the beacon element may perform one or more of the functions illustrated and described above as being performed by the packaged device.

As discussed above and illustrated in the accompanying figures, the present disclosure discloses systems and methods for personalization of devices while packaged. Discovery information may be exchanged between a packaged device and a user device. A communication connection may be configured between the packaged device and the user device. Data may be obtained at the packaged device related to the communication connection. The packaged device may be personalized utilizing the data.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for personalization of a packaged device, comprising:
   exchanging, by a packaged device, discovery information with a personalized user device;
   configuring, by the packaged device, a communication connection with the personalized user device;
   obtaining data at the packaged device related to the communication connection and the personalization of the personalized user device;
   transmitting input confirming an operation to personalize the packaged device; and
   personalizing, utilizing at least a portion of the data, the packaged device; wherein:
   the input confirming the operation results in a purchase of the packaged device; and
   the discovery information is exchanged utilizing a different communication method than is utilized for configuring the communication connection.

2. The method of claim 1, wherein said operation of exchanging discovery information is performed when the packaged device is brought into proximity with the personalized user device.

3. The method of claim 1, wherein said operation of exchanging discovery information is performed utilizing Bluetooth LE.

4. The method of claim 1, wherein said operation of exchanging discovery information further comprises:
periodically transmitting discovery messages from the packaged device; and
determining whether a response to at least one of the transmitted discovery messages is received by the packaged device.

5. The method of claim 1, further comprising operating the packaged device in a packaged power mode while the packaged device is at least partially contained within packaging wherein the packaged power mode utilizes less power than a full power mode.

6. The method of claim 1, wherein said operation of configuring a communication connection comprises configuring the communication connection between the packaged device and the personalized user device via at least one remote computing device.

7. The method of claim 1, wherein said operation of exchanging discovery information further comprises:
receiving at least one inquiry at the packaged device; and
transmitting at least one discovery message from the packaged device in response to the received at least one inquiry.

8. The method of claim 1, wherein the discovery information includes information that identifies the packaged device.

9. The method of claim 1, wherein the data is obtained from at least one of the personalized user device or at least one remote computing device.

10. The method of claim 9, wherein the at least one remote computing device comprises at least one cloud computing configuration.

11. The method of claim 1, wherein said operation of personalizing the packaged device personalizes the packaged device for multiple users.

12. The method of claim 1, wherein the packaged device includes at least one sensor and said operation of exchanging discovery information further comprises:
transmitting at least one discovery message from the packaged device in response to receiving an indication from the at least one sensor.

13. An electronic device, comprising:
a wireless communication interface; and
processor electronics configured to cause the electronic device to perform operations comprising:
exchanging discovery information with a second electronic device over a first wireless communication connection, the second electronic device being a personalized user device;
communicating with the second electronic device over a second wireless communication connection, different from the first wireless communication connection;
receiving personalization data associated with the second electronic device;
transmitting input confirming an operation to personalize the electronic device; and
personalizing the electronic device based at least in part on the received personalization data; wherein:
the input confirming the operation results in a purchase of the electronic device; and
the electronic device is at least partially contained within packaging.

14. The electronic device of claim 13, wherein the electronic device exchanges the discovery information when the electronic device is brought into proximity with the second electronic device.

15. The electronic device of claim 13, wherein the electronic device exchanges the discovery information utilizing Bluetooth LE.

16. The electronic device of claim 13, wherein the electronic device operates in a packaged power mode while the electronic device is at least partially contained within the packaging wherein the packaged power mode utilizes less power than a full power mode.

17. The electronic device of claim 13, further comprising at least one sensor wherein the electronic device transmits at least one discovery message in response to receiving an indication from the at least one sensor.

18. An electronic device, comprising:
a wireless communication interface; and
processor electronics configured to cause the electronic device to perform operations comprising:
exchanging discovery information with a second electronic device over a first wireless communication connection, wherein the second electronic device is at least partially contained within packaging;
communicating with the second electronic device over a second wireless communication connection, different from the first wireless communication connection;
determining at least one item of personalization information associated with the electronic device for use in personalizing the second electronic device;
transmitting the at least one item of personalization information to the second electronic device; wherein the electronic device is a personalized user device; and
receiving, at the electronic device, input confirming an operation to personalize the second electronic device; wherein input confirming the operation results in a purchase of the second electronic device.

19. The electronic device of claim 18, wherein the electronic device exchanges the discovery information when the electronic device is brought into proximity with the second electronic device.

20. The electronic device of claim 18, wherein the electronic device exchanges the discovery information utilizing Bluetooth LE.

21. The electronic device of claim 18, wherein the second wireless communication connection between the electronic device and the second electronic device is routed through an intermediate computing device.

* * * * *